United States Patent
Bierjon et al.

(10) Patent No.: US 6,196,624 B1
(45) Date of Patent: Mar. 6, 2001

(54) CROSS-BEAM AND DISPOSITION THEREOF IN AN AUTOMOBILE VEHICLE

(75) Inventors: Didier Bierjon; Fabrice Droxler, both of Belfort (FR)

(73) Assignee: Ecia Industrie, Boulogne Billancourt (FR)

( * ) Notice: Subject to any disclaimer, the term of this patent is extended or adjusted under 35 U.S.C. 154(b) by 0 days.

(21) Appl. No.: 09/466,787

(22) Filed: Dec. 20, 1999

(30) Foreign Application Priority Data

Dec. 21, 1998 (FR) .................................................. 98 16135

(51) Int. Cl.⁷ .................................................. B62D 25/08
(52) U.S. Cl. ...................... 296/203.02; 296/194; 296/29; 180/68.4; 293/155
(58) Field of Search .............................. 296/203.02, 194, 296/29, 196, 203.01; 180/68.4; 293/155

(56) References Cited

U.S. PATENT DOCUMENTS

| | | | |
|---|---|---|---|
| 5,123,695 | * | 6/1992 | Kanemitsu et al. ........ 296/203.02 X |
| 5,271,473 | * | 12/1993 | Masuda ............................... 180/68.4 |
| 5,348,114 | * | 9/1994 | Yamauchi ................... 296/203.02 X |
| 5,409,288 | * | 4/1995 | Masuda ...................... 296/203.02 X |
| 5,597,198 | * | 1/1997 | Takanishi et al. .......... 296/203.02 X |

FOREIGN PATENT DOCUMENTS

| | | |
|---|---|---|
| 43 07 793 | 9/1994 | (DE) . |
| 2625164 | 6/1989 | (FR) . |
| 2708554 | 2/1995 | (FR) . |

* cited by examiner

*Primary Examiner*—Joseph D. Pape
(74) *Attorney, Agent, or Firm*—Sughrue, Mion, Zinn, Macpeak & Seas, PLLC

(57) ABSTRACT

This cross-beam has a central part (12) forming a support for a heat exchange and two lateral parts (14) forming supports for respective headlights. Each lateral part (14) is connected to the central part (12) by releasable fastening means (22, 26 to 32). The fastening means preferably include, associated with each lateral part (14), two complementary positioning dihedra (D1) respectively on the central part (12) and on the corresponding lateral part (14), and complementary means (22, 26 to 32) for immobilizing the dihedra relative to each other cooperating with each other by relative displacement of the dihedra substantially parallel to their edge (A1).

10 Claims, 4 Drawing Sheets

CROSS-BEAM AND DISPOSITION THEREOF IN AN AUTOMOBILE VEHICLE

BACKGROUND OF THE INVENTION

The present invention concerns a cross-beam and a disposition thereof in an automobile vehicle body.

A prior art cross-beam for automobile vehicles has a central part forming a support for a heat exchanger and two lateral parts forming supports for respective headlights.

A cross-beam of this type is usually manufactured in one piece, for example from a composite material. The shape of the cross-beam is generally specific to the model of the vehicle to which it is fitted. Also, if the cross-beam is damaged, in particular following an impact suffered by the vehicle, it must be replaced in its entirety.

SUMMARY OF THE INVENITON

The object of the invention is to facilitate standardizing and repairing a cross-beam for automobile vehicles.

U.S. Pat. No. 4,850,638 describes a cross-beam of the aforementioned type in which each lateral part is connected to the central part by releasable attachment means.

The invention consists in a cross-beam for automobile vehicles of the type described in U.S. Pat. No. 4,850,638 characterized in that the fastening means include, associated with each lateral part, two complementary positioning dihedra respectively on the central part and on the corresponding lateral part, each dihedron being delimited by two faces meeting along an edge, and complementary means for immobilizing the dihedra relative to each other cooperating with each other by relative displacement of the dihedra substantially parallel to their edge.

According to other features of the cross-beam:
- the complementary immobilizing means include an elastically deformable snap fastener tongue in a face of one of the positioning dihedra adapted to nest in a snap fastener orifice in a complementary face of the other positioning dihedron;
- the complementary immobilizing means include, for each face of one of the dihedra, at least one mortise member cooperating with a tenon member carried by a complementary face of the other dihedron;
- the angle of each positioning dihedron is approximately 90°.

The invention also consists in a disposition of a cross-beam as defined hereinabove in an automobile body, characterized in that each lateral part includes means for fixing it to the body shared with the central part.

According to other features of this disposition:
- the fixing means include two seats through which the cross-beam bears on the body, respectively connected to the central part and to the lateral part, the seats being superposed and fixed to the body by means of a screw passing through two aligned orifices in the respective seats;
- the edge of the orifice of the top seat is delimited by an anti-creep boss nested in the orifice of the bottom seat so that the boss bears directly on the body;
- the orifice of the top seat is lined by an internal metal ring;
- the two bearing seats include aligned respective positioning orifices cooperating with a locating pin fastened to the body.

DESCRIPTION OF THE DRAWINGS

The invention will be better understood after reading the following description which is given by way of example only and with reference to the accompanying drawings, in which.

DETAILED DESCRIPTION OF THE INVENTION

Figure 1:
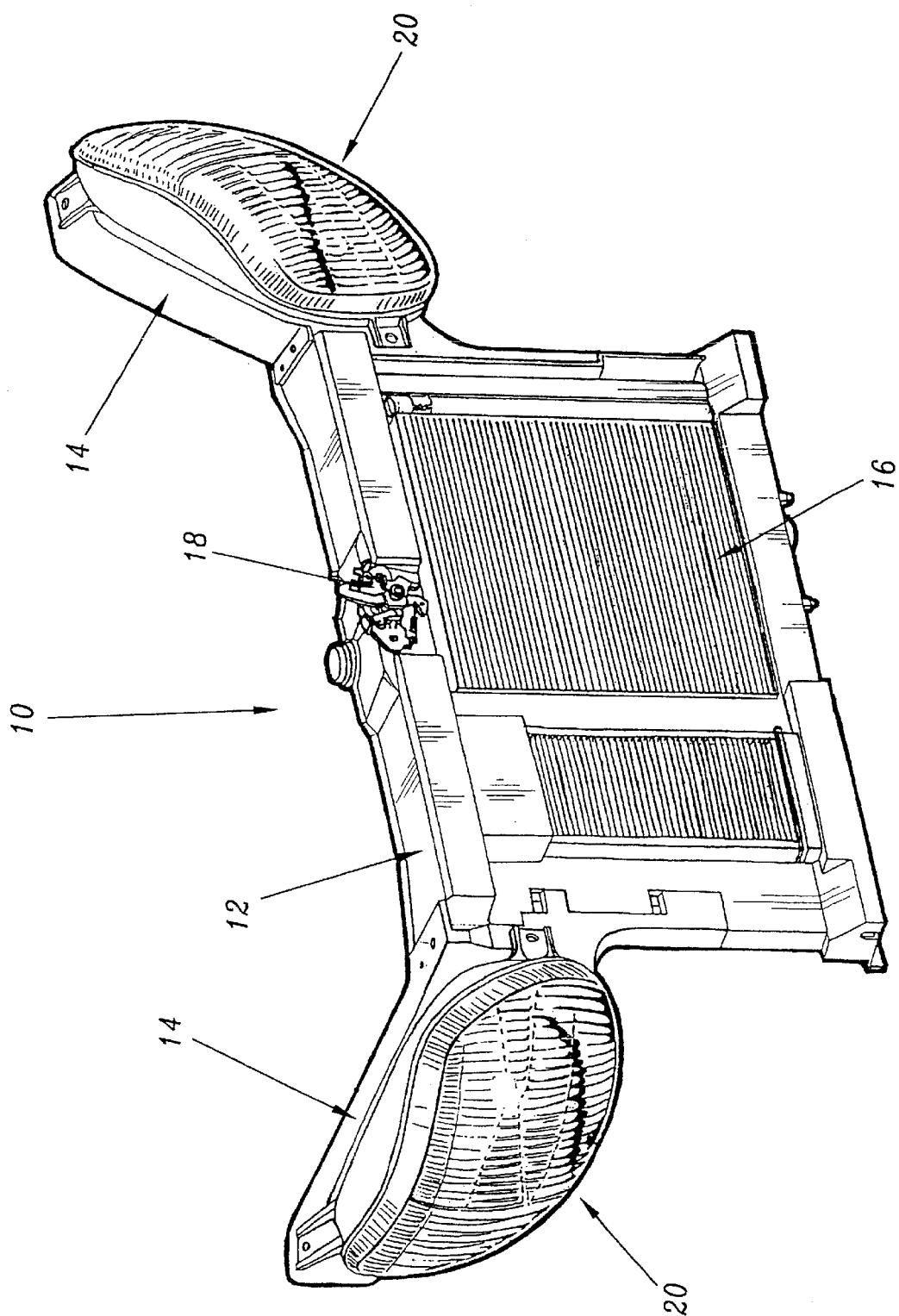
FIG. 1 is a perspective view of a cross-beam in accordance with the invention for an automobile vehicle.

FIG. 1 shows a cross-beam 10 in accordance with the invention for an automobile vehicle. The cross-beam 10 has a central part 12 and two lateral parts 14. The parts 12, 14 are made from a conventional material, for example a synthetic and/or composite material.

The central part 12, the general shape of which is that of a frame, is designed to lie substantially parallel to a transverse vertical plane of the vehicle. The central part 12 forms a support for various standard components, in particular a heat exchanger 16 and means 18 for latching the hood of the vehicle.

The two lateral parts 14 form supports for respective headlights 20 of the vehicle.

Figure 2:
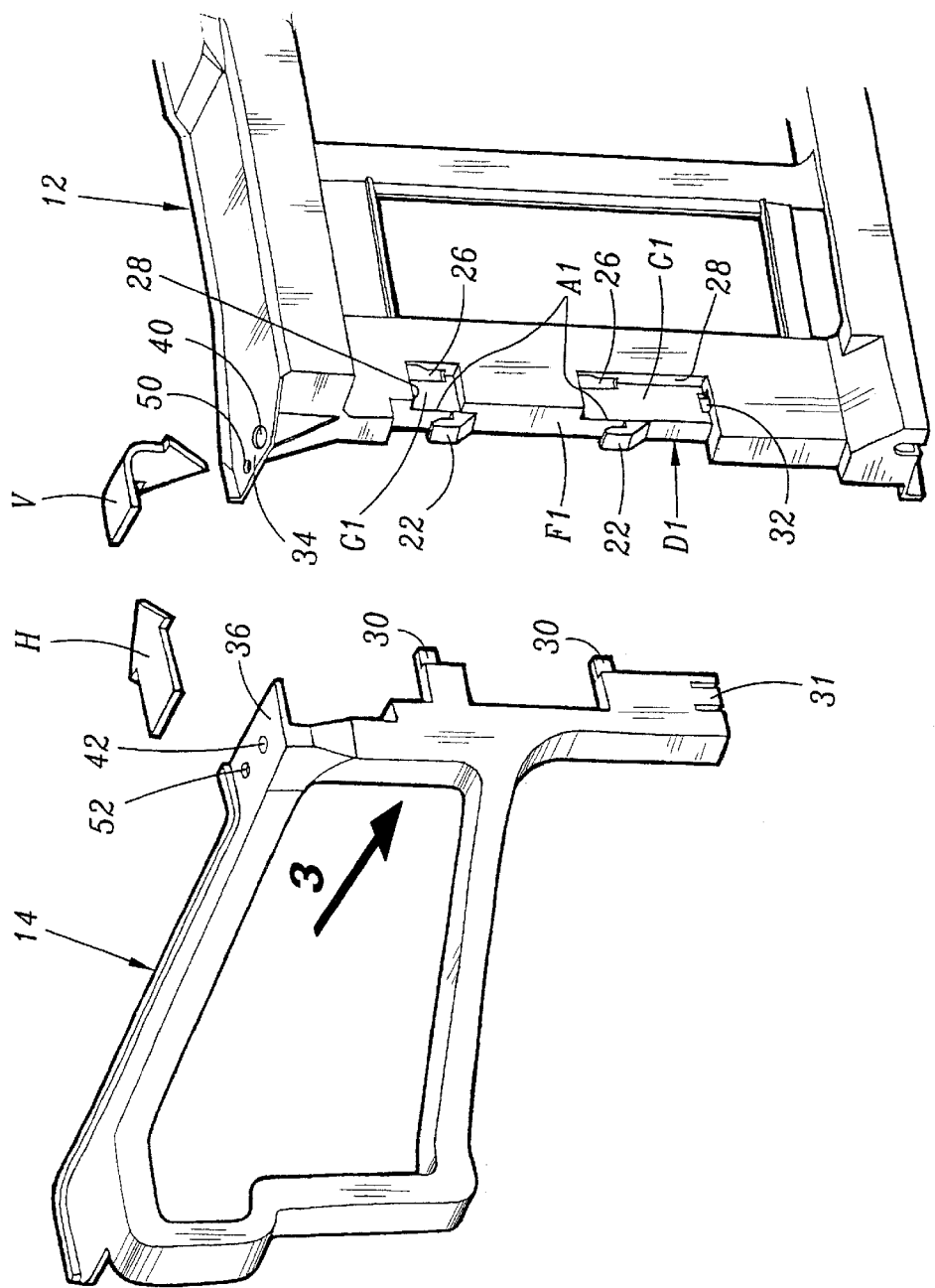
FIG. 2 is a partial view of the cross-beam shown in FIG. 1 during a step of fitting the cross-beam.
Figure 3:
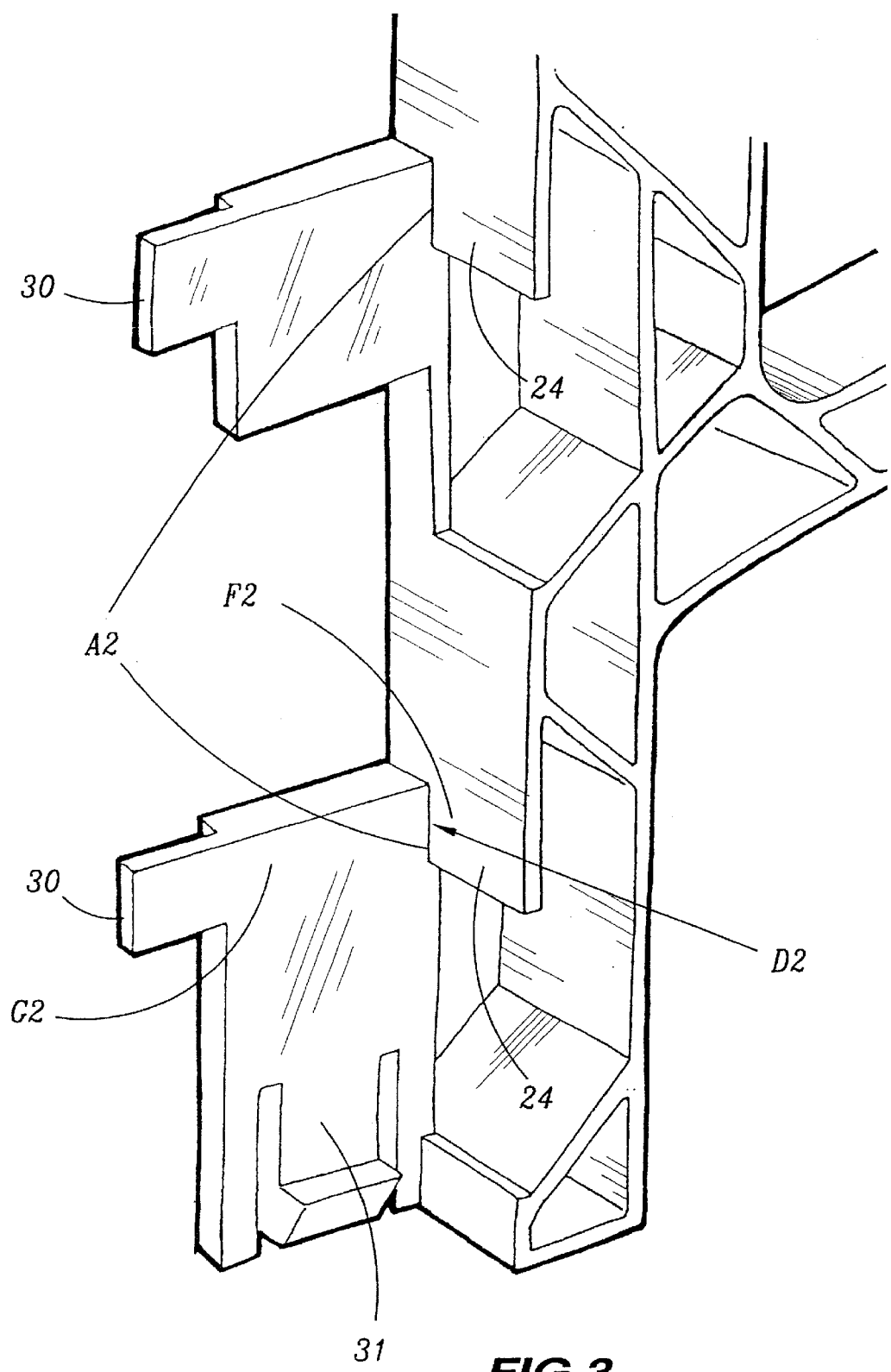
FIG. 3 is a detail view to a larger scale as seen in the direction of the arrow 3 in FIG. 2.
Figure 4:
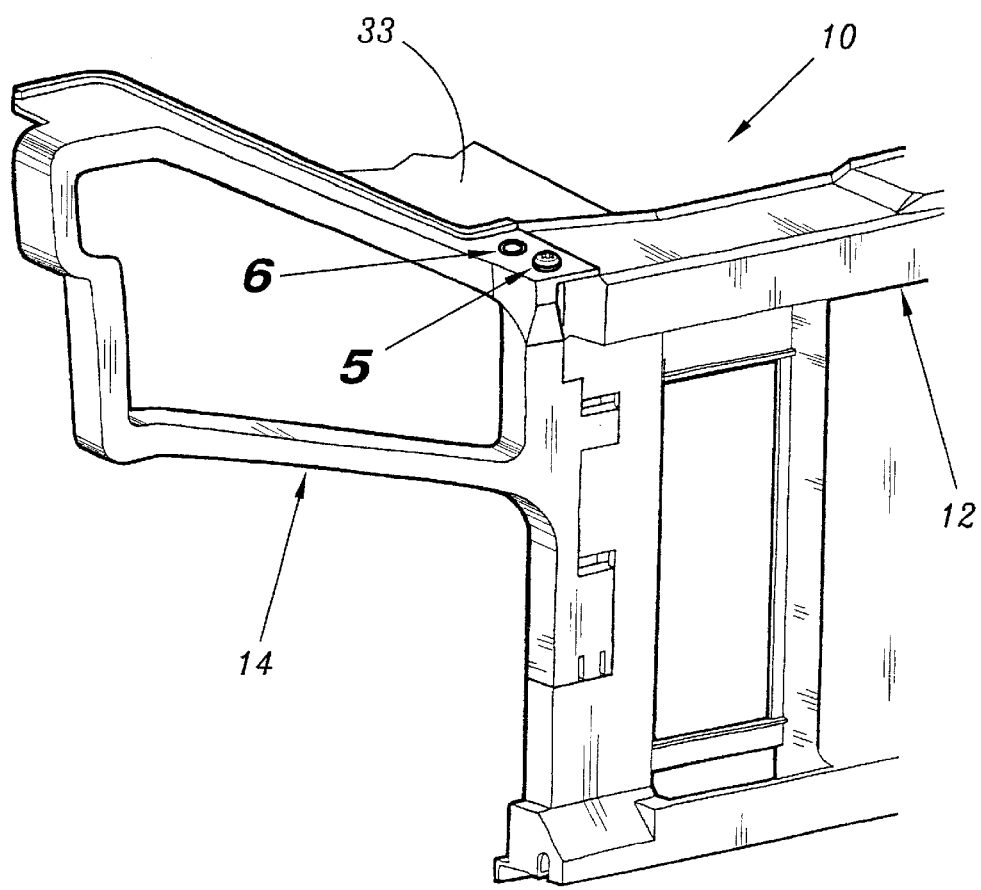
FIG. 4 is a view similar to view 2 showing the cross-beam during a fitting step succeeding that shown in FIG. 2.

Each lateral part 14 is connected to the central part 12 by releasable connecting means shown in detail in FIGS. 2 to 4.

The connecting means include two complementary positioning dihedra D1, D2 associated with each lateral part 14 and respectively on a substantially vertical lateral edge of the frame 12 and on the corresponding part 14. Each dihedron D1, D2 is delimited by two faces F1, G1, F2, G2 which join along an edge A1, A2. The faces F1, G1, F2, G2 may be interrupted, like the edges A1, A2. Thus FIG. 2 shows a face G1 made up of two spaced portions, for example.

In this example, the dihedron D1 on the central part 12 is a contained dihedron (see FIG. 2) and the dihedron D2 formed on the corresponding lateral part 14 is a containing dihedron (see FIG. 3). The angle of each of the dihedra D1, D2 is preferably about 90°.

Each lateral part 14 is immobilized on the central part 12 by complementary means formed on the two parts 12, 14 and cooperating with each other by virtue of relative displacement of the dihedra D1, D2 substantially parallel to their edge A1, A2. The immobilizing means include a pair of hooks 22 carried by a first face F1 of the contained dihedron D1 designed to cooperate with a pair of complementary rigid tongues 24 carried by the complementary face F2 of the containing dihedron D2 and a pair of slots 26 formed in substantially prism-shaped recesses 28 delimited by the second face G1 of the dihedron D1 intended to cooperate with a pair of complementary lugs 30 delimiting the complementary face G2 of the dihedron D2.

The hooks 22 and the slots 26 form mortise members respectively adapted to cooperate with the tongues 24 and the lugs 30, which form tenon members. Each face of a dihedron D1, D2 therefore carries two mortise members adapted to cooperate with two tenon members carried by the complementary face of the other dihedron D2, D1. As an alternative to this, each face of the dihedron D1, D2 can include a single mortise member or a single tenon member.

The means for immobilizing the dihedra D1, D2 relative to each other also include an elastically deformable snap fastener tongue 31 in the face G2 of the containing dihedron D2. The deformable tongue 31 is adapted to nest in a snap fastener orifice 32 in the complementary face G1 of the contained dihedron D1.

As an alternative to this, the snap fastener tongue can be in the face F2 of the containing dihedron to cooperate with a complementary snap fastening orifice in the face F1 of the containing dihedron.

Figure 6:
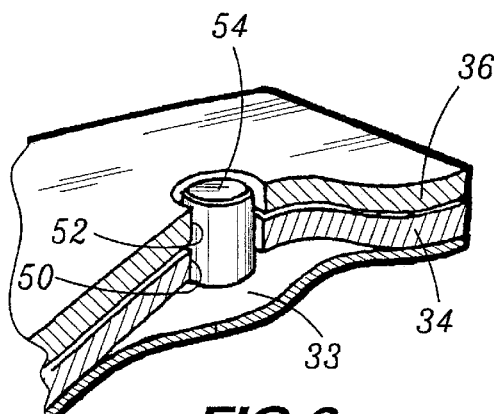
FIGS. 5 and 6 are cutaway detail views as seen in the directions of the arrows 5 and 6 in FIG. 4.
Figure 5:
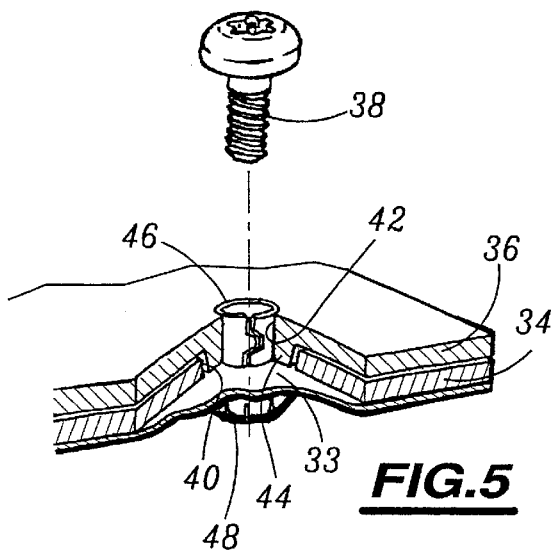

The cross-beam 10 is fixed to the body of the vehicle, more particularly to two panels 33 of the body, for example using the means shown in FIGS. 4–6.

Turning to the latter figures, it can be seen that each lateral part 14 and the central part 12 of the cross-beam include common means for fixing them to a corresponding panel 33 of the body.

The fixing means include a first seat 34, extending the central part 12, adapted to bear on the corresponding panel 33 of the body and a second seat 36, extending the lateral part 14, adapted to bear on the first seat 34. When they have been fixed to the panels 33, the superposed two seats 34, 36 are substantially horizontal.

The two seats 34, 36 are fixed to the panels 33 of the body by means of a screw 38 passing through two aligned orifices 40, 42 in the respective two seats 34, 36 (see FIG. 5). The edge of the orifice 42 in the top seat 36 is delimited by an anti-creep boss 44 nested in the orifice 40 of the bottom seat 34. The boss 44 therefore bears directly on the panel 33.

The orifice 42 of the top seat is preferably lined with an internal metal ring 46.

The screw 38 cooperates with a nut 48 welded to a face of the panel 33 opposite that on which the seats 34, 36 bear.

The bearing seats 34, 36 also include respective positioning orifices 50, 52 which are aligned and nested over a substantially vertical positioning pin 54 fastened to the panel 33 (see FIG. 6).

To fit the cross-beam in accordance with the invention, all that is required is to hook each lateral part 14 onto the central part 12 in the following manner.

First of all, the lateral part 14 is moved toward the central part 12 in the general direction of the arrow H in FIG. 2, so that the complementary dihedra D1, D2 nest one within the other. The central part 12 being fixed, the lateral part 14 is moved substantially vertically downward, parallel to the edges A1, A2 of the dihedra, in the direction of the arrow V in FIG. 2, so that the hooks 22 and the slots 26 respectively interengage with the tongues 24 and the lugs 30. At the end of the vertical travel of the lateral part 14 the snap fastener tongue 31 nests in the snap fastener orifice 32. The lateral part 14 is then immobilized relative to the central part 12.

The standard components such as the heat exchanger 16, the latch 18 and the headlights 20 are then mounted on the cross-beam using means well known in the art.

After fitting the cross-beam 10 with the usual components, it is positioned on the body of the vehicle by nesting the locating pin 54 on each panel 33 in the corresponding positioning orifices 50, 52. The crossbeam 10 is fixed to the panel 33 by means of screws 38 common to the central and lateral parts 12 and 14. Note that the screws 38 both eliminate any clearance between the central and lateral parts 12 and 14 and fix the cross-beam to the panels 33.

The invention is not limited to the embodiment described. In particular, the containing dihedron can be on the central part 12 and the contained dihedron can be on the corresponding lateral part 14.

The advantages of the invention include the following.

The cross-beam of the invention can be assembled and equipped before it is mounted on the body of a vehicle. The cross-beam can therefore be supplied to an automobile manufacturer ready to fit.

The central part 12 of the cross-beam can be standardized so that it is compatible with different models of vehicle. However, the standardized central part 12 can receive lateral parts 14 specific to each model of vehicle.

If one of the lateral parts 14 is damaged, it is easily replaced without replacing the original central part 12.

What is more, the means for mounting the lateral parts 14 on the central part 12 of the cross-beam and for mounting the cross-beam on the body of the vehicle are simple and of low cost.

What is claimed is:

1. Cross-beam for automobile vehicles, of the type including a central part (12) forming a support for a heat exchange (16) and two lateral parts (14) forming supports for respective headlights (20), each lateral part (14) being connected to the central part (12) by releasable fastening means (D1, D2, 22 to 32), characterized in that the fastening means include, associated with each lateral part (14), two complementary positioning dihedra (D1, D2) respectively on the central part (12) and on the corresponding lateral part (14), each dihedron being delimited by two faces (F1, G1, F2, G2) meeting along an edge (A1, A2), and complementary means (22 to 32) for immobilizing the dihedra (D1, D2) relative to each other cooperating with each other by relative displacement of the dihedra (D1, D2) substantially parallel to their edge (A1, A2).

2. Cross-beam according to claim 1, characterized in that the complementary immobilizing means include an elastically deformable snap fastener tongue (31) in a face (G2) of one of the positioning dihedra (D2) adapted to nest in a snap fastener orifice (32) in a complementary face (G1) of the other positioning dihedron (D1).

3. Cross-beam according to claim 1, characterized in that the complementary immobilizing means include, for each face (F1, G1, F2, G2) of one of the dihedra (D1, D2), at least one mortise member (22, 26) cooperating with a tenon member (24, 30) carried by a complementary face (F2, G2, F1, G1) of the other dihedron (D2, D1).

4. Cross-beam according to claim 1, characterized in that the angle of each positioning dihedron (D1, D2) is approximately 90°.

5. Disposition of a cross-beam according to claim 1 in an automobile body, characterized in that each lateral part (14) includes means (38, 54) for fixing it to the body shared with the central part (12).

6. Disposition according to claim 5, characterized in that the fixing means include two seats (34, 36) through which the cross-beam bears on the body, respectively connected to the central part (12) and to the lateral part (14), the seats (34, 36) being superposed and fixed to the body by means of a screw (38) passing through two aligned orifices (40, 42) in the respective seats (34, 36).

7. Disposition according to claim 6, characterized in that the edge of the orifice (42) of the top seat (36) is delimited by an anti-creep boss (44) nested in the orifice (40) of the bottom seat (34) so that the boss (44) bears directly on the body.

8. Disposition according to claim 7 characterized in that the orifice (42) of the top seat (36) is lined by an internal metal ring (46).

9. Disposition according to claim 6, characterized in that the two bearing seats (34, 36) include aligned respective positioning orifices (50, 52) cooperating with a locating pin (54) fastened to the body.

10. Cross-beam according to claim 2, characterized in that the complementary immobilizing means include, for each face (F1, G1, F2, G2) of one of the dihedra (D1, D2), at least one mortise member (22, 26) cooperating with a tenon member (24, 30) carried by a complementary face (F2, G2, F1, G1) of the other dihedron (D2, D1).

* * * * *